United States Patent
Fishel et al.

(10) Patent No.: US 11,203,700 B2
(45) Date of Patent: *Dec. 21, 2021

(54) UV CURABLE SEALANT COMPOSITION AND PROTECTOR APPLIED TO WOOD AND POROUS SUBSTRATES

(71) Applicant: Bond Distributing, Ltd., Eastlake, OH (US)

(72) Inventors: Scott Fishel, Concord, OH (US);
Connor Fishel, Willoughby, OH (US);
Paul Smith, Mentor, OH (US)

(73) Assignee: BOND DISTRIBUTING, LTD., Mayfield Village, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/792,656

(22) Filed: Feb. 17, 2020

(65) Prior Publication Data

US 2020/0181444 A1 Jun. 11, 2020

Related U.S. Application Data

(63) Continuation of application No. 15/581,065, filed on Apr. 28, 2017, now Pat. No. 10,563,083.

(51) Int. Cl.

| | |
|---|---|
| *A23G 3/02* | (2006.01) |
| *C08F 2/46* | (2006.01) |
| *C08F 2/50* | (2006.01) |
| *C08G 61/04* | (2006.01) |
| *C09D 135/02* | (2006.01) |
| *C09D 4/00* | (2006.01) |
| *B27K 3/02* | (2006.01) |
| *B27K 3/52* | (2006.01) |
| *B27K 5/02* | (2006.01) |
| *B27K 3/15* | (2006.01) |
| *B05D 3/06* | (2006.01) |

(52) U.S. Cl.
CPC .......... *C09D 135/02* (2013.01); *B27K 3/0207* (2013.01); *B27K 3/15* (2013.01); *B27K 3/52* (2013.01); *B27K 5/02* (2013.01); *C09D 4/00* (2013.01); *B05D 3/067* (2013.01); *B05D 2203/20* (2013.01); *B27K 2240/70* (2013.01); *B27K 2240/90* (2013.01)

(58) Field of Classification Search
CPC .......... B27K 3/0207; B27K 3/52; B27K 3/15; B27K 5/02; B27K 2240/60; B27K 2240/70; C09D 4/00; C09D 135/02; C08F 222/1006; B05D 3/067; B05D 2203/20

USPC ........ 427/517, 508, 487, 457, 1; 522/6, 189, 522/184, 71, 1; 520/1

See application file for complete search history.

(56) References Cited

U.S. PATENT DOCUMENTS

| | | | |
|---|---|---|---|
| 4,282,269 A | 8/1981 | Lucey | |
| 4,415,603 A | 11/1983 | Valiot et al. | |
| 4,600,649 A | 7/1986 | Leo | |
| 5,128,387 A * | 7/1992 | Shustack | C09D 4/06 |
| | | | 522/33 |
| 5,213,875 A | 5/1993 | Su et al. | |
| 5,453,451 A | 9/1995 | Sokol | |
| 5,571,570 A | 11/1996 | Lake | |
| 5,773,487 A | 6/1998 | Sokol | |
| 6,187,387 B1 | 2/2001 | Bolle et al. | |
| 6,583,195 B2 | 6/2003 | Sokol | |
| 6,835,327 B2 | 12/2004 | Behling | |
| 7,005,002 B2 * | 2/2006 | Glockner | C08G 18/423 |
| | | | 106/31.13 |
| 8,580,894 B2 | 11/2013 | Palushaj et al. | |
| 10,563,083 B2 * | 2/2020 | Fishel | C09D 4/00 |
| 2007/0197384 A1 * | 8/2007 | Yan | B01J 13/22 |
| | | | 503/215 |
| 2011/0071251 A1 | 3/2011 | Dana et al. | |

OTHER PUBLICATIONS

"Restriction Requirement for U.S. Appl. No. 15/581,065", dated Mar. 28, 2019, 6 pages.
"Non-Final Office Action for U.S. Appl. No. 15/581,065", dated Jun. 24, 2019, 8 pages.
"Notice of Allowance and Fees Due for U.S. Appl. No. 15/581,065", dated Oct. 9, 2019, 11 pages.

* cited by examiner

*Primary Examiner* — Jessica Whiteley
(74) *Attorney, Agent, or Firm* — Medley, Behrens & Lewis, LLC

(57) ABSTRACT

An essentially 100% solids, single-component, UV curable, low-viscosity, penetrating sealant composition for wood substrates and other porous substrates is prepared from an acrylate-methacrylate mixture, a functionalized resin, an unsaturated fatty acid triglyceride oil, and a photoinitiator. The sealant composition may further contain a metal catalyst, an amine synergist, fillers, pigments, dyes, flow and leveling additives, air release chemicals, UV absorbers, hindered amine light stabilizers, fungicides, insect repellents, and/or mold inhibitors. The sealant composition exhibits fast cure times along with resistance to degradation.

19 Claims, No Drawings

UV CURABLE SEALANT COMPOSITION AND PROTECTOR APPLIED TO WOOD AND POROUS SUBSTRATES

CROSS-REFERENCE TO RELATED APPLICATION

This application is a continuation of U.S. application Ser. No. 15/581,065, filed Apr. 28, 2017, and published as U.S. 2018/0312714 on Nov. 1, 2018. This prior application is herein incorporated by reference.

FIELD

The present disclosure pertains to compositions which are particularly suited to the treatment, penetration, protection, and enhancement of wood substrates and may also include modifying and augmenting the color of said substrates. More particularly, the present disclosure concerns ultraviolet (UV) curable compositions particularly adapted for the treatment and protection of porous exterior substrates and natural building materials made from wood from exposures which range from natural weathering phenomenon, water infiltration, oxidation processes, insect damage, mold growth, pigment leaching, abrasive actions, and chemical exposure such as acid rain, cleaning chemicals, and disinfectants employed for cleansing.

BACKGROUND

Currently, wood deck stains are comprised of resinous, film-forming coatings which lay on the surface of wood to create a protective barrier to weathering, physical wear, and UV degradation. These coatings have traditionally been based on alkyd enamels, acrylic, and urethane resin-lacquer technology. More recently, water-based versions of these technologies have become common. These resinous approaches do not penetrate deep into the wood, rather, they lay on the surface of the wood forming a resinous film where they are prone to blistering, peeling, and flaking. This limits their durability significantly. The focus has been to improve upon the UV stability of resinous film-forming coatings, but lack of deep penetration of the coatings into the wood substrate has thwarted performance improvements to long-term durability.

The average homeowner will spend thousands of dollars installing and maintaining exterior structures. In particular, the treatment, beautification, and protection of exterior structures, including, but not limited to wooden decks, wooden siding, wooden shutters, wooden shingles, wooden flooring and laminates, synthetic decking, and synthetic wood is not only desirable from an aesthetic point of view, but is necessary to ward off damage imparted to wood and other porous substrates from exposure to physical, biological, and chemical attacks.

It is well known through investigative studies performed by the United States Department of Agriculture's Forestry Products Division (USDA FP Div.) that exterior wooden surfaces are composed of structurally dynamic materials which react directly to the immediate surrounding environment. These structurally dynamic materials have been identified to be the most significant factor contributing to the failure of film-forming exterior paints/coatings/stains on exterior wooden surfaces. Simply stated, exterior wood expands and contracts in reaction to changes in humidity and temperature, making long term adhesion of currently available protective film-forming finishes difficult, if not impossible.

Furthermore, exposed (untreated) exterior wooden structures are susceptible to rot and/or discoloration. This discoloration is typically caused by fungal infection, bacterial infection, and/or UV damage from natural sunlight, and is aggravated by damage caused by seasonal and daily temperature changes. If a fungus or fungi does not infest the substrate, it may, at the least, cause discoloration. Contributing factors to exterior wood discoloration include: (1) fungal infestation of porous surface and sub-surface structures, (2) potential fungal/bacterial digestive damage on the wood itself, and (3) UV damage to the wooden surface which, with rain, may wash away surface layers of wood, thus exposing further wood to UV damage and renewing fungal nutrients and favorable conditions for fungal infestation.

Wood is comprised of three primary 'building block' materials: lignin, cellulose, and hemicellulose. Research results from the USDA FP Div. report that the lignin and related phenolic resin components of wood are most susceptible to UV damage due to chromophore absorbance of UV light. Lignin acts as the primary binder that maintains the structural integrity of wood. UV damage of lignin causes discoloration and the eventual erosion of wood cells and fiber thereof. Polyphenolic compounds cause the lignin matrix to "break down" and be removed by the leaching action of water.

USDA investigation has also revealed that solvents and water components used in wood sealers, preservatives, and stains cause specific structures in wood that control water transport to inhibit the penetration of wood sealers, preservatives, and stains into the wood. These structures effectively act as 'valves' that open and close to control the flow of sap and water from the roots to the leaves in trees. These 'valves' have been shown by the USDA to still be responsive to water and solvents well after the harvesting and processing of the tree. The continued activity of these liquid-transport, controlling structures contributes to the dynamic nature of wood in direct response to ambient temperature and humidity levels.

SUMMARY

In an embodiment disclosed herein, the sealant composition described herein is an essentially 100% solids, UV curable, single-component, low-viscosity penetrating wood protector which may be applied to wood and porous substrates by various methods and tools. In an embodiment described herein, the sealant composition comprises: (a) an acrylate-methacrylate mixture that can undergo polymerization, the acrylate-methacrylate mixture comprising at least an acrylate and at least a methacrylate, the acrylate having a lower molecular weight than the methacrylate, wherein the methacrylate contains allyl or other conjugated unsaturation and multi-functionality for improved surface cure; (b) a functionalized resin having functionality greater than 2 and a dynamic (shear) viscosity of between 1,000 to 100,000 centipoise, such as an oligomeric (meth)acrylate functionalized urethane, polyester, epoxy, or siloxane; (c) an unsaturated fatty acid triglyceride oil capable of entering into a free-radical initiated polymerization; and (d) a mixture of organic and/or inorganic photoinitiators which initiates the polymerization reaction upon exposure of the sealant composition to UV light or electron beam. The sealant composition may further comprise: (e) a metal catalyst; (f) an amine synergist; (g) ultraviolet light absorbers and hindered amine light stabilizers (HALS) for enhanced durability; (h) a blend of fillers, pigments, and/or dyes for imparting special colors to the sealant composition; and (i) specialized organic or inorganic additives, such as fungicides, mold growth inhibitors, insect replants, flow and leveling agents, defoamers, and/or fragrance.

Given the near total absence of water and solvents in the sealant composition, its low viscosity enables it to permeate through wood without triggering liquid transport controlling or impeding structures. Thus, the sealant composition's low viscosity is beneficial to deep penetration and partitioning within the wood to various layers. The low viscosity is a characteristic of the selection of specific (meth)acrylates, oligomers, and unsaturated fatty acid triglyceride oils and their relative weight ratios with respect to one another. Thus, in an embodiment, the sealant composition provides deeper penetration and correspondingly deeper protection, which is especially beneficial when function-specific adjuvants, i.e., fungicide, UV absorber, HALS, in-can stabilizers, and insect repellents are incorporated.

The present UV curable wood sealant composition is particularly useful not only in treating wooden decks, pressure treated wood articles, residential and commercial wooden siding, window frames, doors, trim, flooring, fences, and roof tiles, but also laminates which have been made from wood chips, monolithic wood substitutes, and other natural porous materials produced by a manufacturing process with the end-use application being of the aforementioned items of building construction.

DETAILED DESCRIPTION

In an embodiment, the sealant composition uses a combination of components to impart a tack-free surface in a much shorter period of time (approximately 24 hours or less) and imparts little or no sheen to the surface of the wood or porous substrate. As used herein, the term "sealant composition" means a substance that is spread out over a surface as a liquid at room temperature and cures or dries over time to form a protective coating over the surface. The sealant composition may protect the surface from damage from foreign substances, such as water, air, chemicals, insects, fungi, and light. A previous patent (U.S. Pat. No. 6,583,195 B2), which is herein incorporated by reference, disclosed an acrylate mixture and a mixture of photoinitiators. The present sealant composition improves upon that previous composition by various replacements and additions. For example, the present sealant composition differs from the U.S. Pat. No. 6,583,195 disclosure in that it replaces the acrylate mixture with an acrylate-methacrylate mixture and adds a functionalized resin having functionality greater than 2 and a dynamic (shear) viscosity between 1,000 to 100,000 centipoise, an unsaturated fatty acid triglyceride oil, a metal catalyst, and an amine synergist. Notable improvements are observed relative to the previous patent composition when, for example, the functionalized resin is an oligomeric (meth) acrylate urethane oligomer with 5% to 12% free isocyanate reactive sites. These compositional additions utilize molecular oxygen for the benefit of the polymerization reaction, leading to faster cure times. The previous composition was inhibited by molecular oxygen, as acrylate polymerization typically proceeds slower in the presence of molecular oxygen, which leads to periods of extended surface tackiness.

In an embodiment, the sealant composition described herein is an essentially 100% solids, single-component, UV initiated, low-viscosity penetrating wood stain containing no purposefully added solvents or water. As used herein, the term "single-component" is known to those of ordinary skill in the art and means that the individual elements of the sealant composition are combined and mixed together prior to use, such as at the time of synthesis, such that the sealant composition can be stored and delivered in a single container and requires no mixing of additional components or an activating agent at the time of use. As used herein, the term "essentially 100% solids" means that the thickness of the (wet) sealant composition when first applied (measured in units of length, e.g. millimeters) to a surface does not change appreciably after the sealant composition has finished drying on a surface. The test used to determine percent solids is American Society for Testing and Materials International (ASTM) D1259 "Standard Test Methods for Nonvolatile Content of Resin Solutions."

The sealant composition may be applied to all manner of wood substrates by tools such as a paint roller, brush, Lamb's wool or synthetic microfiber applicator, sprayer, and in the case of in-plant usage, a wide variety of automated applicators such as knifes blade, roll coater, dipping, or other automated applicators.

In an embodiment, the sealant composition comprises: (a) an acrylate-methacrylate mixture that can undergo a polymerization reaction, the acrylate-methacrylate mixture comprising at least an acrylate and at least a methacrylate, the acrylate having a lower molecular weight than the methacrylate, wherein the methacrylate contains allyl or other conjugated unsaturation and multi-functionality for improved surface cure; (b) a functionalized resin having functionality greater than 2 and a dynamic (shear) viscosity of between 1,000 to 100,000 centipoise, such as an oligomeric (meth)acrylate functionalized urethane, polyester, epoxy, or siloxane; (c) an unsaturated fatty acid triglyceride oil capable of entering into a free-radical initiated polymerization; and (d) a mixture of organic and/or inorganic photoinitiators which initiates the polymerization reaction upon exposure of the sealant composition to UV light or electron beam. The sealant composition may further comprise (e) a metal catalyst and (f) an amine synergist. The metal catalyst and amine synergist reduce the activation energy required to cause copolymerization of the unsaturated fatty acid triglyceride oil with the acrylate-methacrylate mixture. Furthermore, the sealant composition may further comprise: (g) ultraviolet light absorbers and HALS for enhanced durability; (h) a blend of fillers, pigments, and/or dyes for imparting special colors to the sealant composition; and (i) specialized organic or inorganic additives, such as fungicides, mold growth inhibitors, insect replants, flow and leveling agents, defoamers, and/or fragrance, which impart certain characteristics to the sealant composition.

The sealant composition should be exposed to some source of light for at least some amount of time in order to effectuate a controlled cure. Specifically, UV light within natural sunlight can bring about a tack-free cure of the sealant composition within a short time. As discussed below, a UV absorber may be employed to control the rate of the polymerization reaction and, secondarily, to enhance components in the wood which are susceptible to damage from UV light.

The acrylate-methacrylate mixture may be present in an amount of 50% to 81% of the total weight of the sealant composition prior to being cured. For example, the acrylate-methacrylate mixture may be present in an amount of 55% to 70%, 60% to 80%, or 70% to 75% of the total weight of the sealant composition prior to being cured. The acrylate and methacrylate may be present in a weight ratio ranging from 9:1 to 2:1. For example, the ratio of the acrylate to the methacrylate can be from 9:1 to 7:1, from 8:1 to 4:1, or from 5:1 to 3:1.

The acrylate-methacrylate mixture used herein can comprise at least an acrylate oligomer of essentially low molecular weight having functionality of greater than 2 and a methacrylate oligomer of essentially low molecular weight having functionality of greater than 2. The acrylate-methacrylate mixture may also contain additional acrylate and methacrylate monomers or oligomers with functionality of essentially 1 or greater to modify viscosity, overall functionality, flexibility, and the degree of crosslinking.

As used herein, the term "functionality" when applied to a monomer means the number of reactive groups in the monomer available for polymerization. When applied to a resin, oligomer, or polymer, the term "functionality" refers to the units of unsaturation present in the resin available for free radical reaction calculated as a number average. In an embodiment, the functionality are units of unsaturation, such as double bonds in the resin. When functionality is greater than 2, three-dimensional cross linking can occur with the resin chains.

The acrylate and the methacrylate of the mixture and the additional acrylate or methacrylates added for viscosity, flexibility, and crosslinking may be selected from commercially available unsaturated acrylic esters and methacrylic esters, such as (meth)acrylic oligomers, mono-(meth)acrylates, di-(meth)acrylates, tri-(meth)acrylates, urethane (meth)acrylates, polyester or polyether (meth)acrylates, epoxy (meth)acrylates, and mixtures thereof. Mixtures of acrylic and methacrylic resins may define the acrylate and the methacrylate, respectively.

Suitable representative acrylates and methacrylates in monomer or oligomer form that may be used in the sealant composition include, for example, polyurethane acrylic, trimethylolpropane triacrylate, 1,6-hexanediol diacrylate, ethoxylated and propoxylated versions of said acrylics, aliphatic urethane acrylates, aromatic urethane acrylates, allyl functional aliphatic urethane acrylate, epoxy acrylics such as ethoxylated Bisphenol A diacrylates, polyester polyol acrylates, acrylated polysiloxanes, acrylated amines and their oligomers, isobornyl acrylate, allyl acrylate and conjugated allyl functionalized dimethacrylates, tetrahydrofuryl acrylate, 2-phenoxyethyl acrylate, multifunctional acrylic esters of functionality greater than 2, and the corresponding methacrylate versions of the above referenced acrylates. Pentaerythritol acrylate and pentaerythritol tetraacrylate monomers can be particularly useful in the sealant composition.

The acrylate-methacrylate mixture in the sealant composition is employed for both viscosity control as well as for regulating the degree of penetration of the sealant composition into a porous substrate. Moreover, the methacrylate contains allyl functionality that enables it to utilize molecular oxygen in formation of peroxy radicals which further react to enhance surface cure.

The sealant composition may further comprise a functionalized resin having functionality greater than 2 and a dynamic (shear) viscosity of 1,000 to 100,000 centipoise, such as 2,500 to 15,000 cps, or 5,000 to 12,000 cps. Suitable functionalized resins may include an oligomeric (meth) acrylate functionalized urethane, polyester, epoxy, or siloxane. In an embodiment, the functionalized resin is an oligomeric (meth)acrylate isocyanate-containing urethane oligomer with 5% to 12% free isocyanate reactive sites, such as, 6% to 11%, or 7% to 10%. In an embodiment, the functionalized resin exhibits dual cure properties, meaning that it cures both with UV light and also secondarily with moisture in shadowed areas. A functionalized resin that can be used in the sealant composition is an oligomeric (meth) acrylate isocyanate-containing urethane oligomer with 5% to 12% free isocyanate reactive sites sold commercially under the name Sartomer CN9302. Sartomer CN9302 has a dynamic (shear) viscosity of 8,500 centipoise at 25° C. This component helps to increase cure time performance, especially when light exposure is limited. The resin having a functionality of greater than 2 allows for three-dimensional crosslinking.

Dynamic (shear) viscosity was determined with a Brookfield type viscometer using ASTM D2196 "Standard Test Methods for Rheological Properties of Non-Newtonian Materials By Rotational Viscometer."

The functionalized resin can be present in an amount of from 4% to 12% of the total weight of the sealant composition prior to being cured. For example, the functionalized resin can be present in an amount of 5% to 8%, 6% to 10%, or 8% to 11% of the total weight of the sealant composition prior to being cured.

The sealant composition may comprise an unsaturated fatty acid triglyceride oil derived from natural, synthetic, or biologically manufactured fatty acid triglycerides capable of entering into a free-radical initiated polymerization. In an embodiment, this component may be a reactive, unsaturated fatty acid triglyceride oil capable of free radical polymerization with the acrylate-methacrylate mixture. In one embodiment, double boiled linseed oil is used as the unsaturated fatty acid triglyceride oil. In another embodiment, acrylated, epoxidized soybean oil is used. The amount of the unsaturated fatty acid triglyceride oil present in the sealant composition can range from 10% to 25% based on the total weight of the sealant composition prior to being cured. For example, the amount of the unsaturated fatty acid triglyceride oil present in the sealant composition can range from 13% to 20%, 18% to 22%, or 20% to 24% based on the total weight of the sealant composition prior to being cured. The unsaturated fatty acid triglyceride oil may be selected from the group comprising linseed oil, tung oil, castor oil, dehydrated castor oil, safflower oil, soya oil, or cottonseed oil. The most reactive triglycerides have $C_{18}$ to $C_{22}$ chains with higher levels of unsaturation, such as linoleic acid and linolenic acid.

The photoinitiator which is used in the sealant composition, as noted, can be a single photoinitiator or a blend or mixture of organic photoinitiators. Photoinitiators which are suitable for use in the sealant composition include, carbonyl compounds include ketones, such as 1-phenyl-2-hydroxy-2-methyl-1-propanone; oligo (2-hydroxy-2-methyl-1-phenyl-propan-1-one); oligo (2-hydroxy-2-methyl-1-(4-(methylvinyl) phenyl) propanone); 2-methyl-1-[4-(methylthio) phenyl]-2-(4-morpholinol)-1-propanone; 1-(hydroxycyclohexyl) phenyl ketone and mixtures thereof; acetophenones, such as α, α-dimethoxy-alpha-phenylacetophenone); benzophenones, such as 2,4,6-trimethylbenzophenone; 4-methylbenzophenone, and other such benzophenone derivatives; non-carbonyl-containing photoinitiators, including phosphine oxide and derivatives thereof, such as phenyl bis(2,6 dimethoxybenzoyl) phosphine oxide; (2,4,4-trimethylpentyl)phosphine oxide, as well as mixtures thereof.

The benzophenone derivatives may be aldehyde-substituted benzophenones, cycloalkyl-substituted, or aryl-substituted benzophenones. Furthermore, the substituted component may be further substituted with alkyl or aryl substituents. The phosphine oxide may be similarly substituted.

In an embodiment, the photoinitiator is a combination of photoinitiators. A preferred photoinitiator comprises a mixture of (a) a blend of: (1) bis(2,6-dimethoxybenzoyl)(2,4,4-trimethylpentyl) phosphine oxide; and (2) 1-hydroxycyclohexyl phenyl ketone; (b) 2-methyl-1-[4-(methylthio) phenyl]-2-[4-morpholinyl]-1-propanone, and (c) a mixture or blend of: (1) 2,4,6-trimethylbenzophenone; (2) 4-methylbenzophenone; and oligo(2-hydroxy-2-methyl-1-4-methylvinylphenyl) propanone. These photoinitiator blends are well known and commercially available. Photoinitiators (a) and (b) are sold under the trademarks Irgacure™ 819 and 907, respectively, by BASF Corporation. Photoinitiator (c) is sold by Sartomer under the name Esacure™ KTO 46 and Genocure* TPO-L by Rahn. Another photoinitiator which may be used is sold commercially under the name Irgacure 2022.

Photoinitiators (a), (b), and (c) can be present in weight ratio ranges of 0.5 to 1.0:0.03 to 1.0:0.5 to 1.0, respectively. For example, the ratios of photoinitiators (a), (b), and (c) can be 0.5 to 0.7:0.03 to 0.2:0.6 to 0.8, 0.6 to 0.9:0.1 to 0.5:0.5 to 0.7, or 0.7 to 0.9:0.1 to 0.4:0.8 to 0.9. The photoinitiator may be present in an amount ranging from 0.001% to 2.0% by weight, based upon the total weight of the sealant composition prior to being cured, such as, from 0.001% to 1.0% by weight, based on the total weight of the sealant composition prior to being cured. For example, the photoinitiator may be present in an amount of 0.005% to 0.5%, 0.4% to 1.0%, or 0.8% to 1.9% by weight, based on the total weight of the sealant composition prior to being cured.

It is to be appreciated that the amount of photoinitiator used herein is significantly less than many other compositions in the prior art.

The metal catalyst, may, for example, be an iron-containing or tin-containing catalyst. For example, the metal catalyst may be a 12% active iron complex sold commercially under the name Borchi Oxycoat. Another example metal catalyst is a tin-containing catalyst, dibutylin dilaurate. The metal catalyst reduces the activation energy required to cause copolymerization of the unsaturated fatty acid triglyceride oil with the acrylates and methacrylates in the acrylate-methacrylate mixture. The metal catalyst may be present in an amount of from 0.3% to 1.1% of the total weight of the sealant composition prior to being cured. For example, the metal catalyst may be present in an amount of 0.4% to 0.6%, 0.5% to 0.8%, or 0.7% to 1.0% of the total weight of the sealant composition prior to being cured.

Furthermore, the sealant composition may also comprise an amine synergist. A preferred amine synergist is sold commercially under the name Drier Rx. Another preferred amine synergist is an amine modified polyether acrylate sold commercially under the trade name Sartomer CN501. Like the metal catalyst, the amine synergist reduces the activation energy required to cause polymerization of the unsaturated fatty acid triglyceride oil with the acrylates and methacrylates of the acrylate-methacrylate mixture. The amine synergist may be present in an amount of from 0.12% to 0.72% of the total weight of the sealant composition prior to being cured. For example, the amine synergist may be present in an amount of from 0.13% to 0.25%, from 0.2% to 0.5%, or from 0.4% to 0.7% of the total weight of the sealant composition prior to being cured.

Because of the market demand for protection against UV damage, a UV absorber, a combination of UV blockers, or a HALS (hindered-amine light stabilizers) may be incorporated into the sealant composition. Generally, the UV blocker(s) may be present in an amount ranging from 0.01% to 5% by weight, based upon the total weight of the sealant composition prior to being cured. For example, the UV blocker(s) may be present in an amount of from 0.05% to 1%, from 2% to 4%, or from 2.5% to 4.5%. The 'UV blocker' is any one of the HALS or UV absorber type blockers, such as, for example: sebacate, decanedioic, propanoic, and propanoic $C_{n-9}$-branched alkyl esters; benzoxazole, oxirane compounds; hydroxyhydrocinnamantate, hydroxyhydrophosphate, and benzotriazole triazine derivatives, as well as mixtures thereof. When a HALS is included in the sealant composition, it may be beneficial to employ a sebacate-containing HALS, such as Tinuvin 292 (BASF), which is a blend of 1,2,2,6,6-pentamethyl-4-piperidinol, bis(1,2,2,6,6-pentamethyl-4-piperidenyl) sebacate, and methyl (1,2,2,6,6-pentamethyl-4-piperidenyl) sebacate. A UV absorber that may be used is commercially available and sold under the name Tinuvin 1130.

The sealant composition may include certain adjuvants or combinations of adjuvants in order to achieve certain properties. For example, it is contemplated that a filler may be admixed into the sealant composition. The filler not only fills the pores of the surface, but also aids in controlling the penetration of the sealant composition into the porous substrate. As penetrating properties vary from the various types of wood, a filler may be used to provide surface protection to the target substrate. Without a filler, it is possible that the sealant composition will penetrate through the target substrate.

An inert filler that is compatible with the sealant composition and other adjuvants may be used herein. For example, fumed silica; polymer fillers such as polyethylene and polytetrafluoroethylene; cellulosic fillers; filler clays, such as betonite clay, kieselguhr earth, and calcium metasilicate, as well as mixtures thereof, may be used. When used, the filler may be present in amount of from 0.01% to 4.0% of the total weight of the sealant composition prior to being cured. For example, the filler can be present in an amount of from 0.05% to 0.5%, from 0.4% to 1.5%, or from 1.8% to 3.0% of the total weight of the sealant composition prior to being cured.

In order to put the filler into the sealant composition, a dispersant may be used. Generally, the dispersant may be present in an amount of from 0.01% to 2.0% by weight, based upon the total weight of the sealant composition prior to being cured. For example, the dispersant may be present in an amount of from 0.05% to 0.5%, from 0.4% to 1.3%, or from 1.2% to 1.8% of the total weight of the sealant composition prior to being cured. In an embodiment, a commercially available dispersant sold under the name Disperbyk 163 by Byk Chemie may be used.

In order to impart a particular color to the sealant composition when dried, the sealant composition may comprise pigments and/or dyes. When present, the pigment and/or dye may be present in an amount of from 0.01% to 40% by weight, based upon the total weight of the sealant composition prior to being cured. For example, the pigment and/or dye may be present in an amount from 0.1% to 1%, from 2% to 4%, or from 5% to 15% by weight, based upon the total weight of the sealant composition prior to being cured.

The sealant composition may also incorporate a fungicide to inhibit fungal infestation or growth. Fungicide or combination of fungicides, organic or inorganic, that are compatible with the other components of the sealant composition (compatible meaning there is no tendency towards precipitation when mixed with the sealant composition at room temperature and 1 atm) may be used herein. When a fungicide is included in the sealant composition, a particularly preferred fungicide is a commercially available fungicide sold under the name Proxel GXL (1,2-benzisothiazolin-3-one) by Lonza. Another fungicide that may be used is 3-iodo-2-propynyl butyl carbamate marketed by Troy Chemical Corp. under the trade name Troysan Polyphase™. Yet another fungicide that may be used is a commercially available fungicide sold under the name Buson 1498. The fungicide may be present an amount of from 0.3% to 2.0% based on the total weight of the sealant composition prior to being cured. For example, the fungicide may be present in amount of from 0.4% to 0.8%, from 0.7% to 1.5%, or from 1.3% to 1.9% based on the total weight of the sealant composition prior to being cured.

Also, natural or synthetic insect repellents such as a thiazole, citronella, or cedarwood oil (scent) may be incorporated into the sealant composition in effective quantities. Additionally, animal repellents may similarly be incorporated into the mixture. Such repellents include synthetic or natural animal extracts commercially available to repel animals from eating or living in or on treated structures.

Commercially available insecticides may also be incorporated into the sealant composition at effective concentrations. For example, the insecticide o,o-diethyl o-(3,5,6-trichloro-2-pyridinyl), marketed by Dow Agro Sciences under the trade name Dursban™ may be included in the sealant composition.

A defoamer may be included in the sealant composition in order to hinder the formation of foam in the sealant composition. A preferred defoamer is commercially available and sold under the name Byk A 530 by Byk Chemie. The defoamer may be present in an amount of from 0.1% to 0.8% based on the total weight of the sealant composition prior to being cured. For example, the defoamer may be present in an amount of from 0.125% to 0.25%, from 0.15% to 0.40%, or from 0.3% to 0.7% based on the total weight of the sealant composition prior to being cured.

In an embodiment, the sealant composition of the present application has high reactivity, which distinguishes it from some other products such as the composition of U.S. Pat. No. 6,583,195. However, also unlike certain two-part sealant compositions, embodiments of the sealant composition disclosed herein are also conducive to stabilization with in-can stabilizers. Accordingly, in an embodiment, to stabilize the composition from premature polymerization, the shelf-life can be lengthened and in-can stability of the sealant composition can be improved by adding one or more in-can stabilizers. Genorad* 18, Ascinin 0445, and mixtures thereof are preferred in-can stabilizers and can significantly extend the in-can stability of the sealant composition. Methyl ether of hydroquinone and volatile proprietary ketoximes stabilize UV activated compositions, such as the present sealant composition, by inhibiting free radical generation in acrylates and drying oils. Without suitable levels of in-can stabilizers, the sealant composition may gel prematurely rendering it unusable. A three-year shelf life, wherein the composition maintains its physical state without gelling, is possible when the sealant composition is stored below 95° F. in the absence of UV light, i.e., packaging the sealant composition in a black container impervious to UV and natural light wavelengths. Additionally, purging the sealant composition with dry nitrogen increases resistance to premature gelation. In embodiments, the shelf life of the sealant composition may be 1 to 5 years, 1.5 to 3.5 years, or 2 to 3 years.

When present, in-can stabilizers can be present in an amount of from 0.5% to 2.5% of the total weight of the sealant composition prior to being cured. For example, in-can stabilizers can be present in an amount of from 0.6% to 0.9%, from 0.8% to 1.5%, or from 1.3% to 2.2% of the total weight of the sealant composition prior to being cured.

The acrylate-methacrylate mixture, the functionalized resin, and the unsaturated fatty acid triglyceride oil provide chemical and physical characteristics to the sealant composition that enable it to be resistant to damage from environmental and biological agents. Conjugated unsaturation in the form of an allyl moiety combined with multifunctional methacrylate sites within the same monomer enables coordination with molecular oxygen to form a peroxy compound in-situ, thus releasing free radical species capable of initiating polymerization at the foremost surface of the wood. The unsaturated fatty acid triglyceride oil's unsaturation enters into the free radical reaction with the acrylates in the acrylate-methacrylate mixture, creating an essentially completed crosslinked matrix. The unsaturated fatty acid triglyceride oil chains impart a modest amount of flexibility, but more specifically aid in driving the free radical polymerization essentially to completion. The presence of a metal catalyst along with an amine synergist speeds up the rate of cure and attainment of an essentially tack-free surface. During periods of shade or darkness a significant reduction to the UV radiative intensity takes place. The incorporation of an isocyanate capped urethane oligomer further improves surface cure by reacting with water molecules in the air regardless of decreased UV radiation.

This polymerization process is further demonstrated by first initiating polymerization on wood panels treated with the sealant composition by exposure of the sealant composition to natural sunlight for a modest amount of time and then placing the still-wet wood panels into total darkness and assessing degree of polymerization the following day versus a control panel that is exposed to only natural sunlight. Physical properties of the wood protector are similar regardless of the exact curing regimen as long as there is a sufficient period of exposure to natural sunlight. In either situation, the wood panels cure tack-free at the foremost surface. It is evidenced that the sealant composition is more robust to surface cure and requires substantially less sunlight exposure time overall to impart a tack-free cured surface than conventional sealing solutions.

It has been found that the sealant composition is absorbed into wood, providing a deeper penetration and longer term protection against weathering, erosion, and fungal attack. In essence, upon curing, the sealant composition becomes part of the cellular structure of the wood itself.

Without being bound by theory, it is believed that the penetrating acrylate resins of the sealant composition act to stabilize lignin by immersing the lignin and other wood components and structures in a liquid resin, which then becomes a solid polymer. The resulting polymer is formulated to be resistant to environmental damage, such as UV and biological attack. The acrylate resins enter the porous substrate by the same means that water and waterborne biological agents do and then solidifies (polymerizes) in and throughout the porous substrate, thereby occupying, obstructing, and reducing the channels by which subsequent waterborne agents may enter the substrate. Thus, freeze-thaw damage is reduced by reducing the substrate's permeability to water. Further, fungal infestation and subsequent damage from waterborne fungal agents is reduced.

The sealant composition eliminates the use of solvents and/or water (which are conventionally used) as viscosity moderating factors in the formulation of wood sealer, preservatives, and stains. For example, solvents and water combined may comprise no more than from 0.01% to 0.3% of the total weight of the sealant composition prior to being cured. For example, solvents and water may comprise no more than from 0.02% to 0.1%, from 0.15% to 0.2%, or from 0.75% to 0.25% of the total weight of the sealant composition prior to being cured. Previously, sealers, preservatives, and stains have incorporated water and/or solvents, such as mineral spirits, to maintain the formula solids in a liquid state.

In an embodiment, the sealant composition is both organic-solvent-free as well as water-free, rendering the sealant composition substantially 100% solids with the exception of any scent oils, insect repellents, UV absorbers, or dyes/pigments.

In an embodiment, the sealant composition, when applied on a wood surface, forms a layer on top of the wood surface with a thickness of from 0.001 to 25 µm. For example, the layer on top of the wood surface may have a thickness of from 0.1 to 5 µm, from 1 to 15 µm, or from 7 to 20 µm.

In an exemplary method for manufacturing the sealant composition, the fillers, dispersion, fungicides, UV blockers, the photoinitiator, and the acrylate-methacrylate mixture are dispersed or mixed together at ambient conditions and at high shear until the sealant composition is homogeneous.

In an embodiment, after mixing, the sealant composition is allowed to stand for a sufficient time to permit the release of entrapped air prior to weighing and packaging. The shelf-life of the sealant composition is enhanced by packaging under dry nitrogen gas. After mixing the sealant composition, it is filtered and allowed to stand to release any entrapped air due to the high shear mixing process.

The sealant composition is storage stable without evidencing any separation or settling of the acrylic components over an extended period of time. Typically, if there is any component settling of the inert filler(s) and pigments, the sealant composition can be rendered homogeneous with manual stirring.

To achieve optimal aesthetics of the wood, the sealant composition is applied to a clean, weathered, exterior wood surface which has been treated and scrubbed to remove any aged, discolored, or damaged surface material. It must be appreciated that most exterior porous surfaces, not only wood, are susceptible to infestation and discoloration from biological agents as well as waterborne and airborne dirt. Therefore, this cleaning process is not limited to wood surfaces, but any exterior porous surfaces that are susceptible to infestation and discoloration from biological agents as well as waterborne and airborne dirt. This cleaning process optimizes the final aesthetics of the exterior wood surface, but is not vital to the efficacy of the sealant composition. Furthermore, the sealant composition can be applied to a substantially dry surface having been allowed to dry for about 48 hours from last having been exposed to water.

A method of preparing and cleaning weathered, exterior wood surfaces of both sun damaged and physically damaged wood in preparation for sealing with the sealant composition can be a single step or a two-step process. Generally, as a first step, the process comprises applying a bleaching (or oxidizing) agent to the construction material or substrate and an optional second step comprising applying an acidic agent. The application may be achieved by any suitable method such as spring, rolling, or brushing. As noted below, the preparation process may comprise solely the application of the bleaching agent.

The bleaching agent serves a three-fold purpose, i.e., as an anti-biological agent, a bleaching agent, and a cleaning agent. First, the bleaching agent serves to kill fungal, bacterial, and other bio-forms on and in the wood surface. Secondly, the bleaching agent functions to render bio-forms colorless while promoting the bleaching of other wood stains. Third, the bleaching agent aids in the dissolving and the removing of UV damaged wood components. The effective dwell time which renders the bleach effective is directly dependent upon the type and concentration of the bleaching agent and the ambient temperature of the substrate and bleaching agent. This typically varies from as little as less than one minute to as long as several hours prior to neutralization or rinsing with water. If used as a stand-alone treatment, the bleaching agent is rinsed off with (preferably) pressurized water with or without manual scrubbing of the surface. Suitable pressurized water, such as from a typical garden hose, is sufficient to wash away the bleaching agent and debris.

When the bleaching step is followed by an acid treatment step, then the rinsing away of the bleaching agent with water is optional and is not necessary. The direct application of the acidic agent over the bleaching agent is an acceptable practice.

The bleaching step may be used independently of any other preparation for using the sealant composition and does not require a follow-on acid treatment. However, an acid treatment step has been found to be effective in both neutralizing the bleaching agent and in suppressing a bleaching appearance by promoting the development of the natural colors inherent in the wood.

Thus, the acid treatment step (second step) serves to at least partially neutralize the alkaline bleaching agent, promote the development of the wood's inherent natural colors, and wash away any remaining debris which may be acid soluble. The effective dwell time which renders the acidic agent effective is directly dependent upon the type and concentration of the acidic agent, the concentration and type of the bleaching agent to be neutralized, and the ambient temperature of the substrate and acidic agent. This dwell time typically varies from as little as less than one minute to as long as several hours prior to rinsing with water (physically scrubbing the surface is optional). Ordinarily, it is not effective to use the acidic agent as a stand-alone treatment. The acidic agent is rinsed off with (preferably pressurized) water with or without manual scrubbing of the surface to aid in removing surface debris. Suitable pressurized water, such as from a typical garden hose, is sufficient to wash away the acidic agent and debris.

It is to be appreciated that the two-step preparatory treatment eliminates the need to pressure wash exterior wood surfaces prior to application of the sealant composition. Previously, it was typically required to pressure wash exterior wood surfaces to remove damaged surface wood and stains prior to sealing. The present two-step process enables optimal results with the sealant composition while eliminating the need for costly pressure washing. Further, if it is opted to pressure wash wood surfaces along with the present two-step preparation, care must be taken not to damage the surface with excessive blasting force from the pressure wash nozzle.

Bleaching agents which may be used include an aqueous solution of effective concentration selected from the group consisting of chlorinated and non-chlorinated bleaching agents, such as sodium metasilicate, sodium sesquicarbonate, or sodium hypochlorite. Such aqueous bleaching solution may comprise a blend of suitable bleaching agents.

The acidic agent may be an aqueous solution of an effective concentration of organic acids selected from the group consisting of oxalic acid, succinic acid, and/or boric acid, as well as mixtures thereof.

The single or two-step preparation is not necessary in all embodiments, such as for a new, unstained surface.

The sealant composition can be applied in any suitable manner such as by spray, brush, or roller. When sprayed, a homogeneous mixture issues from the nozzle of the spray equipment. "Homogeneous" is understood to mean that the composition of each droplet in the issued spray is substantially of the same composition of that from the reservoir from which the material to be sprayed was drawn. Because of the nature of the sealant composition, the sealant composition is able to permeate a porous substrate until the substrate is saturated. However, total saturation is not required. It is only required that the outer surface of the wood be treated, with deeper protection being achieved as more of the sealant composition is absorbed, until full saturation occurs.

The sealant composition should be exposed to some source of light for at least some amount of time in order to effectuate a controlled tack-free cure. Specifically, UV light within natural sunlight can bring about tack-free cure of the sealant composition within a short time. For example, the sealant composition should be exposed to UV light, such as sunlight, for at least 2 hours.

For example, an effective tack-free cure time is 6 hours or more, such as between 6 and 12 hours, or 7 to 10 hours, regardless of the length of duration of direct sunlight, given consideration to changing exterior weather and environmental conditions, such as no rain. That is, even in cloudy conditions and low sunlight the composition should reach a tack-free cure within 12 hours. With at least some direct sunlight, but no rain, an even more effective tack-free cure time may be achieved in 6 to 8 hours. A tack-free cure or tack-free cured means that when a clean white cloth is swiped across a surface with moderate manual pressure (such as 2.5 psi) on which the sealant composition has been applied, there is no color transfer onto the clean white cloth. Tack-free cured surfaces also do not exhibit water damage in the presence of heavy rain. These times are substantially less than the times contemplated by commercial embodiments of the previous patent application (U.S. Pat. No. 6,583,195).

The aforementioned sealant composition may be modified to accommodate line curing of pre-stained decking. For example, the sealant composition can be applied by automated manufacturing processes to generate pre-stained decking cure under traditional UV curing conditions; for instance, 350 to 600 mJ/cm$^2$, 400 to 500 mJ/cm$^2$ and in some instance as low as 340 to 380 mJ/cm$^2$ at line speeds of, e.g., 100 to 500 ft/min, such as 200 to 300 ft/min, or 250 to 350 ft/min. Consequentially, the sealant composition exhibits significantly improved surface tack-free cure denoted by fast line speeds producing no discernible tackiness at the surface of the finished stained wood decking.

The sealant composition offers significant advantages over conventional multifunctional acrylic oligomer based UV curable wood coatings, especially in light of high curing rates achievable on automated production lines. These advantages encompass rapid through-cure at relatively low photoinitiator levels, tack-free cure with excellent stacking resistance, uniform penetration of the sealant composition into the decking due to significantly reduced viscosity, and excellent resistance to chipping, peeling, and flaking.

Not all embodiments disclosed herein must possess the characteristics discussed above. Furthermore, the claims are not to be limited by any such characteristics discussed herein unless recited in the claim itself.

The examples disclosed below further describe the technology. The examples also illustrate useful methodology for practicing the technology. The examples do not limit the claims. In the examples, all parts are by weight absent indications to the contrary.

Examples

TABLE 1

| Example Composition 1 | Amount (pbw) |
| --- | --- |
| Propoxylated Trimethylolpropane triacrylate | 50.00 |
| Trimethylolpropane triacrylate | 18.40 |
| Aliphatic urethane acrylate | 10.00 |
| Allyl dimethacrylate | 12.00 |
| Photoinitiator 1 | 0.70 |
| Photoinitiator 2 | 0.70 |
| Hindered amine light stabilizer (HALS) | 0.93 |
| Fungicide | 1.20 |
| Defoamer | 0.30 |
| Extender pigment | 5.17 |
| Hydrophobically treated silica | 0.60 |
| | 100.00 |

Photoinitiator 1 = Irgracure 819
Photoinitiator 2 = Genocure* TPO-L
Allyl dimethacrylate = Sartomer SR523
HALS = Tinuvin 292
Defoamer = Byk A 530
Extender pigment = 325 mesh calcium metasilicate
Hydrophobically treated silica = Aerosil 272

In preparing example composition 1, all of the components were mixed together in a vessel equipped with a high shear dispersion blade at moderate speed (2000 to 4000 fps peripheral blade tip speed) until homogeneous. Thereafter, the example composition 1 was mixed at high shear for about thirty-five minutes while maintained at approximately 1800 rpm. Thereafter, example composition 1 was filtered to remove any undispersed filler. Then, example composition 1 was allowed to stand for a sufficient time to permit the release of entrapped air prior to weighing and packaging. The shelf-life of example composition 1 was enhanced by packaging under dry nitrogen gas introduced under positive pressure in order to displace headspace oxygen and moisture. Example composition 1 was ready for use as a protector for porous materials, including exterior and interior wood or suitable porous substrates of natural or synthetic compositions, such as wood laminates, and pressed board.

TABLE 2

| Example Composition 2 | Amount (pbw) |
| --- | --- |
| Trimethylolpropane triacrylate | 67.60 |
| Allyl aliphatic urethane acrylate | 10.60 |
| Allyl dimethacrylate | 12.00 |
| Pentaerythritol acrylate | 4.40 |
| Photoinitiator 1 | 0.60 |
| Photoinitiator 2 | 0.60 |
| 12% active Iron complex | 1.05 |
| Amine synergist | 0.72 |
| Hindered amine light stabilizer (HALS) | 0.93 |
| Fungicide | 1.20 |
| Defoamer | 0.30 |
| | 100.00 |

Photoinitiator 1 = Irgacure 819
Photoinitiator 2 = Genocure* TPO-L
Allyl dimethacrylate = Sartomer SR523
HALS = Tinuvin 292
Defoamer = Byk A 530
12% active Iron complex = Borchi Oxycoat
Amine synergist = Sartomer CN-501

Example composition 2 was prepared using a procedure similar to the procedure used in the preparation of example composition 1. Example composition 2 was designed specifically to be a wood protector.

TABLE 3

| Example Composition 3 | Amount (pbw) |
| --- | --- |
| Trimethylolpropane triacrylate | 68.00 |
| Aliphatic urethane acrylate | 12.40 |
| Allyl dimethacrylate | 10.00 |
| Pentaerythritol acrylate | 4.40 |
| Photoinitiator 1 | 0.60 |
| Photoinitiator 2 | 0.60 |
| 12% active Iron complex | 1.05 |
| Amine synergist | 0.52 |
| Hindered amine light stabilizer (HALS) | 0.93 |
| Fungicide | 1.20 |
| Defoamer | 0.30 |
| | 100.00 |

Photoinitiator 1 = Irgracure 819
Photoinitiator 2 = Genocure* TPO-L
Allyl dimethacrylate = Sartomer SR523
HALS = Tinuvin 292
Defoamer = Byk A 530
12% active Iron complex = Borchi Oxycoat
Amine synergist = Sartomer CN-501

Example composition 3 was prepared using a procedure similar to the procedure used in the preparation of example composition 1. Example composition 3 was designed specifically to be a wood protector.

TABLE 4

| Example Composition 4 | Amount (pbw) |
| --- | --- |
| Trimethylolpropane triacrylate | 45.80 |
| Aliphatic urethane acrylate | 10.00 |
| Allyl dimethacrylate | 10.00 |
| Unsaturated fatty acid triglyceride oil | 25.00 |
| Pentaerythritol acrylate | 4.00 |
| Photoinitiator 1 | 0.60 |
| Photoinitiator 2 | 0.60 |
| 12% active Iron complex | 1.05 |
| Amine synergist | 0.52 |
| Hindered amine light stabilizer (HALS) | 0.93 |
| Fungicide | 1.20 |
| Defoamer | 0.30 |
| | 100.00 |

Photoinitiator 1 = Irgracure 819
Photoinitiator 2 = Genocure* TPO-L
Allyl dimethacrylate = Sartomer SR523
Unsaturated fatty acid triglyceride oil = Double Boiled Linseed Oil
HALS = Tinuvin 292
Defoamer = Byk A 530
12% active Iron complex = Borchi Oxycoat
Amine synergist = Drier Rx Example composition 4 was prepared using a procedure similar to the procedure used in the preparation of example composition 1. Example composition 4 was designed specifically to be a wood protector, and substitutes an unsaturated fatty acid triglyceride oil for some of the trimethylolpropane triacrylate.

TABLE 5

| Example Composition 5 | Amount (pbw) |
| --- | --- |
| Trimethylolpropane triacrylate | 48.15 |
| Aliphatic urethane acrylate | 10.00 |
| Allyl dimethacrylate | 8.50 |

TABLE 5-continued

| Example Composition 5 | Amount (pbw) |
| --- | --- |
| Unsaturated fatty acid triglyceride oil | 25.00 |
| Pentaerythritol acrylate | 4.00 |
| Photoinitiator 1 | 0.40 |
| Photoinitiator 2 | 0.50 |
| 12% active Iron complex | 0.40 |
| Amine synergist | 0.22 |
| Hindered amine light stabilizer (HALS) | 1.33 |
| Fungicide | 1.20 |
| Defoamer | 0.30 |
| | 100.00 |

Photoinitiator 1 = Irgracure 819
Photoinitiator 2 = Genocure* TPO-L
Allyl dimethacrylate = Sartomer SR523
Unsaturated fatty acid triglyceride oil = Double Boiled Linseed Oil
HALS = Tinuvin 292
Defoamer = Byk A 530
12% active Iron complex = Borchi Oxycoat
Amine synergist = Drier Rx Example composition 5 was prepared using a procedure similar to the procedure used in the preparation of example composition 1. Example composition 5 was designed specifically to be a wood protector, and substitutes an unsaturated fatty acid triglyceride oil for some of the trimethylolpropane triacrylate.

TABLE 6

| Example Composition 6 | Amount (pbw) |
| --- | --- |
| Trimethylolpropane triacrylate | 62.15 |
| Aliphatic urethane acrylate | 10.00 |
| Allyl dimethacrylate | 7.00 |
| Unsaturated fatty acid triglyceride oil | 15.00 |
| Pentaerythritol acrylate | 2.00 |
| Photoinitiator 1 | 0.40 |
| Photoinitiator 2 | 0.50 |
| 12% active Iron complex | 0.30 |
| Amine synergist | 0.22 |
| Hindered amine light stabilizer (HALS) | 0.93 |
| Fungicide | 1.20 |
| Defoamer | 0.30 |
| | 100.00 |

Photoinitiator 1 = Irgacure 819
Photoinitiator 2 = Genocure* TPO-L
Allyl dimethacrylate = Sartomer SR523
Unsaturated fatty acid triglyceride oil = Double Boiled Linseed Oil
HALS = Tinuvin 292
Defoamer = Byk A 530
12% active Iron complex = Borchi Oxycoat
Amine synergist = Drier Rx Example composition 6 was prepared using a procedure similar to the procedure used in the preparation of example composition 1. Example composition 6 was designed specifically to be a wood protector, and substitutes an unsaturated fatty acid triglyceride oil for some of the trimethylolpropane triacrylate.

TABLE 7

| Control Composition | Amount (pbw) |
| --- | --- |
| Trimethylolpropane triacrylate | 41.12 |
| Aliphatic urethane acrylate | 9.62 |
| Propoxylated Trimethylolpropane triacrylate | 25.41 |

TABLE 7-continued

| Control Composition | Amount (pbw) |
| --- | --- |
| Isobornyl acrylate | 8.32 |
| Pentaerythritol acrylate | 3.98 |
| Trimethylolpropane tri-3(-mercaptopropionate) | 0.95 |
| Tint Dispersion | 7.80 |
| Photoinitiator 1 | 0.80 |
| Photoinitiator 2 | 0.50 |
| Fungicide | 1.20 |
| Defoamer | 0.30 |
| | 100.00 |

Photoinitiator 1 = Irgracure 2022
Photoinitiator 2 = Genocure* TPO-L
Defoamer = Byk A 530

A control composition was prepared using a procedure similar to the procedure used in the preparation of example composition 1. Notably, the control composition does not contain an unsaturated fatty acid triglyceride oil, allyl dimethacrylate, a metal catalyst, or an amine synergist.

TABLE 8

| Example Composition 7 | Amount (pbw) |
| --- | --- |
| Trimethylolpropane triacrylate | 54.50 |
| Aliphatic urethane acrylate | 10.00 |
| Allyl dimethacrylate | 12.00 |
| Unsaturated fatty acid triglyceride oil | 15.00 |
| Pentaerythritol acrylate | 2.25 |
| Photoinitiator 1 | 0.40 |
| Photoinitiator 2 | 0.50 |
| 12% active Iron complex | 0.60 |
| Amine synergist | 0.32 |
| Hindered amine light stabilizer (HALS) | 0.93 |
| Fungicide | 1.20 |
| Defoamer | 0.30 |
| Pigment dispersion | 2.00 |
| | 100.00 |

Photoinitiator 1 = Irgracure 819
Photoinitiator 2 = Genocure* TPO-L
Allyl dimethacrylate = Sartomer SR523
Unsaturated fatty acid triglyceride oil = Double Boiled Linseed Oil
HALS = Tinuvin 292
Defoamer = Byk A 530
12% active Iron complex = Borchi Oxycoat
Amine synergist = Drier Rx Example composition 7 was prepared using a procedure similar to the procedure used in the preparation of example composition 1. Example composition 7 was designed specifically to be a more preferred wood protector with aesthetically pleasing qualities, and substitutes an unsaturated fatty acid triglyceride oil for some of the trimethylolpropane triacrylate.

TABLE 9

| Example Composition 8 | Amount (pbw) |
| --- | --- |
| Trimethylolpropane triacrylate | 61.50 |
| Aliphatic urethane acrylate | 10.00 |
| Allyl dimethacrylate | 7.00 |
| Unsaturated fatty acid triglyceride oil | 15.00 |
| Pentaerythritol acrylate | 2.25 |
| Photoinitiator 1 | 0.40 |
| Photoinitiator 2 | 0.50 |
| 12% active Iron complex | 0.60 |

TABLE 9-continued

| Example Composition 8 | Amount (pbw) |
| --- | --- |
| Amine synergist | 0.32 |
| Hindered amine light stabilizer (HALS) | 0.93 |
| Fungicide | 1.20 |
| Defoamer | 0.30 |
| | 100.00 |

Photoinitiator 1 = Irgracure 819
Photoinitiator 2 = Genocure* TPO-L
Allyl dimethacrylate = Sartomer SR523
Unsaturated fatty acid triglyceride oil = Acrylated, epoxidized soybean oil = CN111
HALS = Tinuvin 292
Defoamer = Byk A 530
12% active Iron complex = Borchi Oxycoat
Amine synergist = Drier Rx Example composition 8 was prepared using a procedure similar to the procedure used in the preparation of example composition 1. Example composition 8 was designed specifically to be a wood protector, and substitutes acrylated, epoxidized soybean oil for the unsaturated fatty acid triglyceride oil.

TABLE 10

| Example Composition 9 | Amount (pbw) |
| --- | --- |
| Trimethylolpropane triacrylate | 55.10 |
| Aliphatic urethane acrylate | 8.00 |
| Alyl dimethacrylate | 5.00 |
| Unsaturated fatty acid triglyceride oil | 17.00 |
| Pentaerythritol tetraacrylate | 2.00 |
| Genorad * 18 | 1.50 |
| Pigment dispersion | 7.50 |
| Photoinitiator 1 | 0.05 |
| Photoinitiator 2 | 0.35 |
| UV Absorber | 1.00 |
| Hindered amine light stabilizer (HALS) | 1.00 |
| Fungicide | 1.20 |
| Defoamer | 0.30 |
| | 100.00 |

Photoinitiator 1 = Irgracure 819
Photoinitiator 2 = Genocure* TPO-L
Allyl dimethacrylate = Sartomer SR523
Unsaturated fatty acid triglyceride oil = Double Boiled Linseed Oil
HALS = Tinuvin 292
Defoamer = Byk A 530

Example composition 9 was prepared using a procedure similar to the procedure used in the preparation of example composition 1. However, the oligomers and monomers were first loaded into the mixing vessel and mixing began. Then the pigment tint dispersion was added and mixed thoroughly for 20 minutes. Finally, additives and photoinitiators were added. The completed sealant composition was then filtered through a So-Clean filter vessel equipped with a 50 µm rated bag filter into a plastic container. Example composition 9 was designed specifically to be a more preferred wood protector. Example composition 9 used Genorad* 18 to extend its in-can stability.

TABLE 11

| Example Composition 10 | Amount (pbw) |
| --- | --- |
| Trimethylolpropane triacrylate | 38.00 |
| Aliphatic urethane acrylate | 10.00 |
| Isobornyl acrylate | 6.22 |
| Allyl dimethacrylate | 4.27 |
| Unsaturated fatty acid triglyceride oil | 23.00 |
| Pentaerythritol tetraacrylate | 2.75 |

TABLE 11-continued

| Example Composition 10 | Amount (pbw) |
| --- | --- |
| Photoinitiator 1 | 0.57 |
| Photoinitiator 2 | 0.68 |
| 12% active Iron complex | 0.20 |
| Amine synergist | 0.12 |
| Hindered amine light stabilizer (HALS) | 1.34 |
| Fungicide | 1.20 |
| Defoamer | 0.30 |
| Pigment dispersion | 5.91 |
| Extender pigment | 5.00 |
| Fumed silica | 0.44 |
| | 100.00 |

Photoinitiator 1 = Irgracure 819
Photoinitiator 2 = Genocure* TPO-L
Isobornyl acrylate = Miramer 1121
Allyl dimethacrylate = Sartomer SR523
Unsaturated fatty acid triglyceride oil = Double Boiled Linseed Oil
Pentaerythritol acrylate = Miramer M420
HALS = Tinuvin 292
Defoamer = Byk A 530
12% active Iron complex = Borchi Oxycoat
Amine synergist = Drier Rx Example composition 10 was prepared using a procedure similar to the procedure used in the preparation of example composition 9. Example composition 10 was designed to accommodate line curing of pre-stained decking.

TABLE 12

| Example Composition 11 | Amount (pbw) |
| --- | --- |
| Trimethylolpropane triacrylate | 71.40 |
| Dual cure urethane acrylate | 8.00 |
| Aliphatic urethane acrylate | 0.00 |
| Allyl dimethacrylate | 5.00 |
| Unsaturated fatty acid triglyceride oil | 0.00 |
| Pentaerythritol ethoxylated tetraacrylate | 2.00 |
| Photoinitiator 1 | 0.35 |
| Photoinitiator 2 | 0.05 |
| DBTDL Catalyst | 0.00 |
| Amine synergist | 0.00 |
| Hindered amine light stabilizer (HALS) | 2.00 |
| UV Absorber | 0.00 |
| Fungicide | 1.20 |
| Defoamer | 0.00 |
| Pigment Dispersion | 7.50 |
| Genorad * 18 | 1.50 |
| ASCINNIN 0445 | 1.00 |
| | 100.00 |

Dual cure urethane acrylate = Sartomer CN9302
Aliphatic urethane acrylate = PU320
Photoinitiator 1 = Irgracure 2002
Photoinitiator 2 = Genocure* TPO-L
DBTDL Catalyst = Dibutyltin dilaurate
Allyl dimethacrylate = Sartomer SR523
Unsaturated fatty acid triglyceride oil = Double Boiled Linseed Oil
Pentaerythritol ethoxylated acrylate = Miramer M4004
HALS = Tinuvin 292
UV Absorber = Tinuvin 1130
Fungicide = Busan 1498
Defoamer = Byk A 530
Amine synergist = Drier Rx Example composition 11 was prepared using a procedure similar to the procedure used in the preparation of example composition 9. Example composition 11 used Sartomer CN9302 as an oligomeric (meth)acrylate urethane oligomer with 5% to 12% free isocyanate reactive sites. Notably, example composition 11 lacks unsaturated fatty acid triglyceride oil.

TABLE 13

| Example Composition 12 | Amount (pbw) |
| --- | --- |
| Trimethylolpropane triacrylate | 54.40 |
| Dual cure urethane acrylate | 8.00 |
| Aliphatic urethane acrylate | 0.00 |
| Allyl dimethacrylate | 5.00 |
| Unsaturated fatty acid triglyceride oil | 17.00 |
| Pentaerythritol ethoxylated tetraacrylate | 2.00 |
| Photoinitiator 1 | 0.35 |
| Photoinitiator 2 | 0.05 |
| DBTDL Catalyst | 0.00 |
| Amine synergist | 0.00 |
| Hindered amine light stabilizer (HALS) | 2.00 |
| UV Absorber | 0.00 |
| Fungicide | 1.20 |
| Defoamer | 0.00 |
| Pigment Dispersion | 7.50 |
| Genorad * 18 | 1.50 |
| ASCINNIN 0445 | 1.00 |
| | 100.00 |

Dual cure urethane acrylate = Sartomer CN9302
Aliphatic urethane acrylate = PU320
Photoinitiator 1 = Irgracure 2002
Photoinitiator 2 = Genocure* TPO-L
DBTDL Catalyst = Dibutyltin dilaurate
Allyl dimethacrylate = Sartomer SR523
Unsaturated fatty acid triglyceride oil = Double Boiled Linseed Oil
Pentaerythritol ethoxylated acrylate = Miramer M4004
HALS = Tinuvin 292
UV Absorber = Tinuvin 1130
Fungicide = Busan 1498
Defoamer = Byk A 530
Amine synergist = Drier Rx Example composition 12 was prepared using a procedure similar to the procedure used in the preparation of example composition 9. Example composition 12 used Sartomer CN9302 as an oligomeric (meth)acrylate urethane oligomer with 5% to 12% free isocyanate reactive sites.

TABLE 14

| Example Composition 13 | Amount (pbw) |
| --- | --- |
| Trimethylolpropane triacrylate | 54.40 |
| Dual cure urethane acrylate | 4.00 |
| Aliphatic urethane acrylate | 4.00 |
| Allyl dimethacrylate | 5.00 |
| Unsaturated fatty acid triglyceride oil | 17.00 |
| Pentaerythritol ethoxylated tetraacrylate | 2.00 |
| Photoinitiator 1 | 0.35 |
| Photoinitiator 2 | 0.05 |
| DBTDL Catalyst | 0.00 |
| Amine synergist | 0.00 |
| Hindered amine light stabilizer (HALS) | 2.00 |
| UV Absorber | 0.00 |
| Fungicide | 1.20 |
| Defoamer | 0.00 |

TABLE 14-continued

| Example Composition 13 | Amount (pbw) |
| --- | --- |
| Pigment Dispersion | 7.50 |
| Genorad * 18 | 1.50 |
| ASCINNIN 0445 | 1.00 |
| | 100.00 |

Dual cure urethane acrylate = Sartomer CN9302
Aliphatic urethane acrylate = PU320
Photoinitiator 1 = Irgracure 2002
Photoinitiator 2 = Genocure* TPO-L
DBTDL Catalyst = Dibutyltin dilaurate
Allyl dimethacrylate = Sartomer SR523
Unsaturated fatty acid triglyceride oil = Double Boiled Linseed Oil
Pentaerythritol ethoxylated acrylate = Miramer M4004
HALS = Tinuvin 292
UV Absorber = Tinuvin 1130
Fungicide = Busan 1498
Defoamer = Byk A 530
Amine synergist = Drier Rx Example composition 13 was prepared using a procedure similar to the procedure used in the preparation of example composition 9. Example composition 13 used Sartomer CN9302 as an oligomeric (meth)acrylate urethane oligomer with 5% to 12% free isocyanate reactive sites.

TABLE 15

| Example Composition 14 | Amount (pbw) |
| --- | --- |
| Trimethylolpropane triacrylate | 46.60 |
| Dual cure urethane acrylate | 8.00 |
| Aliphatic urethane acrylate | 0.00 |
| Allyl dimethacrylate | 5.00 |
| Unsaturated fatty acid triglyceride oil | 25.00 |
| Pentaerythritol ethoxylated tetraacrylate | 2.00 |
| Photoinitiator 1 | 0.15 |
| Photoinitiator 2 | 0.05 |
| DBTDL Catalyst | 0.00 |
| Amine synergist | 0.00 |
| Hindered amine light stabilizer (HALS) | 2.00 |
| UV Absorber | 0.00 |
| Fungicide | 1.20 |
| Defoamer | 0.00 |
| Pigment Dispersion | 7.50 |
| Genorad * 18 | 1.50 |
| ASCINNIN 0445 | 1.00 |
| | 100.00 |

Dual cure urethane acrylate = Sartomer CN9302
Aliphatic urethane acrylate = PU320
Photoinitiator 1 = Irgracure 2002
Photoinitiator 2 = Genocure* TPO-L
DBTDL Catalyst = Dibutyltin dilaurate
Allyl dimethacrylate = Sartomer SR523
Unsaturated fatty acid triglyceride oil = Double Boiled Linseed Oil
Pentaerythritol ethoxylated acrylate = Miramer M4004
HALS = Tinuvin 292
UV Absorber = Tinuvin 1130
Fungicide = Busan 1498
Defoamer = Byk A 530
Amine synergist = Drier Rx Example composition 14 was prepared using a procedure similar to the procedure used in the preparation of example composition 9. Example composition 14 used Sartomer CN9302 as an oligomeric (meth)acrylate urethane oligomer with 5% to 12% free isocyanate reactive sites.

TABLE 16

| Example Composition 15 | Amount (pbw) |
| --- | --- |
| Trimethylolpropane triacrylate | 59.40 |
| Dual cure urethane acrylate | 10.00 |
| Aliphatic urethane acrylate | 0.00 |
| Alyl dimethacrylate | 5.00 |
| Unsaturated fatty acid triglyceride oil | 10.00 |
| Pentaerythritol ethoxylated tetraacrylate | 2.00 |
| Photoinitiator 1 | 0.35 |
| Photoinitiator 2 | 0.05 |
| DBTDL Catalyst | 0.00 |
| Amine synergist | 0.00 |
| Hindered amine light stabilizer (HALS) | 2.00 |
| UV Absorber | 0.00 |
| Fungicide | 1.20 |
| Defoamer | 0.00 |
| Pigment Dispersion | 7.50 |
| Genorad * 18 | 1.50 |
| ASCINNIN 0445 | 1.00 |
| | 100.00 |

Dual cure urethane acrylate = Sartomer CN9302
Aliphatic urethane acrylate = PU320
Photoinitiator 1 = Irgracure 2002
Photoinitiator 2 = Genocure* TPO-L
DBTDL Catalyst = Dibutyltin dilaurate
Allyl dimethacrylate = Sartomer SR523
Unsaturated fatty acid triglyceride oil = Double Boiled Linseed Oil
Pentaerythritol ethoxylated acrylate = Miramer M4004
HALS = Tinuvin 292
UV Absorber = Tinuvin 1130
Fungicide = Busan 1498
Defoamer = Byk A 530
Amine synergist = Drier Rx Example composition 15 was prepared using a procedure similar to the procedure used in the preparation of example composition 9. Example composition 15 used Sartomer CN9302 as an oligomeric (meth)acrylate urethane oligomer with 5% to 12% free isocyanate reactive sites.

TABLE 17

| Example Composition 16 | Amount (pbw) |
| --- | --- |
| Trimethylolpropane triacrylate | 54.40 |
| Dual cure urethane acrylate | 1.60 |
| Aliphatic urethane acrylate | 6.40 |
| Allyl dimethacrylate | 5.00 |
| Unsaturated fatty acid triglyceride oil | 17.00 |
| Pentaerythritol ethoxylated tetraacrylate | 2.00 |
| Photoinitiator 1 | 0.35 |
| Photoinitiator 2 | 0.05 |
| DBTDL Catalyst | 0.00 |
| Amine synergist | 0.00 |
| Hindered amine light stabilizer (HALS) | 2.00 |
| UV Absorber | 0.00 |
| Fungicide | 1.20 |
| Defoamer | 0.00 |

TABLE 17-continued

| Example Composition 16 | Amount (pbw) |
|---|---|
| Pigment Dispersion | 7.50 |
| Genorad * 18 | 1.50 |
| ASCINNIN 0445 | 1.00 |
| | 100.00 |

Dual cure urethane acrylate = Sartomer CN9302
Aliphatic urethane acrylate = PU320
Photoinitiator 1 = Irgracure 2002
Photoinitiator 2 = Genocure* TPO-L
DBTDL Catalyst = Dibutyltin dilaurate
Allyl dimethacrylate = Sartomer SR523
Unsaturated fatty acid triglyceride oil = Double Boiled Linseed Oil
Pentaerythritol ethoxylated acrylate = Miramer M4004
HALS = Tinuvin 292
UV Absorber = Tinuvin 1130
Fungicide = Busan 1498
Defoamer = Byk A 530
Amine synergist = Drier Rx Example composition 16 was prepared using a procedure similar to the procedure used in the preparation of example composition 9. Example composition 16 used Sartomer CN9302 as an oligomeric (meth)acrylate urethane oligomer with 5% to 12% free isocyanate reactive sites.

The example compositions reach a tack-free cured state on wood decking in approximately 6 to 16 hours depending on a plurality of variables, including intensity of the sunlight, duration of exposure to direct sunlight, ambient temperature, coverage rate, and absorptive characteristics of the specific wood. A tack-free cure was achieved in under 16 hours in all cases, and in about 6 to 12 hours for tack-free cured times always followed the trend: Pressure Treated Pine (shortest)<White Pine<Cedar (longest).

The sealant composition was stained with the pigment in the amounts shown in the tables and mixed as explained above. The stained sealant composition was then applied to different types of porous wood substrates, cured to tack-free cured state, and then subjected to accelerated weathering in a Cleveland Q-Panel QUV condensation cabinet. Measurements were then taken to determine how effective the example compositions were in preventing discoloration in different porous wood substrates. Measurements used CIELAB units; specifically, L, a, b units measuring changes in lightness-darkness, red-green, and yellow-blue, respectively. The following delta E*ab values were obtained after 700 hours of QUV exposure using ASTM D 4587, Cycle 2 test protocol.

TABLE 18

| EXAMPLE COMPOSITION NUMBER | PANEL DESIGNATION: | QUV Exposure: 700 Hours ASTM D 4587, CYCLE 2 | | | |
|---|---|---|---|---|---|
| | | Initial L | Initial a | Initial b | Final delta E*ab E*ab |
| CONTROL | Pressure Treated Pine: Cured in sun box | 55.32 | 12.11 | 33.25 | 18.23 |
| 7 | Pressure Treated Pine: Cured in sun box | 55.02 | 15.55 | 34.90 | 14.43 |
| 7 | Cedar: Cured in sun box | 46.38 | 19.46 | 30.94 | 10.79 |
| 7 | White Pine: Cured in sun box | 53.97 | 19.65 | 35.84 | 12.61 |
| 8 | Pressure Treated Pine: Cured in sun box | 51.53 | 15.77 | 31.01 | 12.20 |
| 8 | White Pine: Cured in sun box | 58.67 | 17.20 | 38.21 | 15.99 |
| 8 | Cedar: Cured in sun box | 46.34 | 18.26 | 25.47 | 9.88 |
| 9 | Pressure Treated Pine: Cured in sun box | 55.22 | 14.69 | 34.10 | 18.10 |
| 9 | White Pine: Cured in sun box | 57.39 | 18.51 | 39.28 | 17.37 |
| 9 | Cedar: Cured in sun box | 46.26 | 18.65 | 29.72 | 8.72 |
| 8 | Pressure Treated Pine: Cured in natural sun | 56.10 | 14.05 | 34.86 | 19.05 |
| 8 | White Pine: Cured in natural sun | 57.96 | 17.36 | 38.39 | 11.75 |
| 8 | Cedar: Cured in natural sun | 50.02 | 15.52 | 30.76 | 7.21 |
| 9 | Pressure Treated Pine: Cured in natural sun | 53.49 | 13.77 | 31.92 | 18.40 |
| 9 | White Pine: Cured in natural sun | 56.45 | 17.36 | 36.53 | 12.70 |
| 9 | Cedar: Cured in natural sun | 49.57 | 15.20 | 63.53 | 10.93 |

The control composition was an acrylate composition primarily comprising aliphatic urethane acrylate, trimethylolpropane triacrylate, and pentaerythritol tetraacrylate. The control composition did not include any allyl dimethacrylate, unsaturated fatty acid triglyceride oil, or isocyanate capped aliphatic urethane acrylate. The control composition was cured in approximately 18 hours in the sun box.

Delta E*ab values employed a rating scale as follows: (1) 0.00 to 8.00—Slightly Observable Change, (2) 9.00 to 16.00—Minor Change, (3) 17.00 to 24.00—Moderate Change, and (4) 25.00 to 32.00—Significant Change. Most of the contribution to the delta E*ab values was from the lightness-darkness value (L). Minimal changes occurred within the red-green (a) and yellow-blue (b) values.

Results for selected experiments are given in Table 18. Each experiment (with one exception, example composition 8, pressure treated pine cured in natural sun) showed improvement in delta E*ab values compared to the control composition. In particular, cedar showed a relatively large improvement in delta E*ab values as compared to the control composition.

TABLE 19

| Cure Times | Example Composition Numbers | | | | | | |
|---|---|---|---|---|---|---|---|
| (Hours) | 9 | 11 | 12 | 13 | 14 | 15 | 16 |
| White Pine: Cured in sun box | 12.0 | >13.0 | 7.5 | 6.0 | 6.0 | 9.5 | 11.0 |
| Pressure Treated Pine: Cured in sun box | 11.0 | 13.0 | 7.0 | 5.5 | 6.0 | 9.0 | 10.0 |
| Cedar: Cured in sun box | 12.5 | >13.0 | 8.5 | 7.0 | 7.5 | 9.5 | 11.0 |
| Final delta E*ab – 700 hours QUV-Pressure Treated Pine: Cured in sun box | | 11.53 | 10.87 | 10.04 | 14.65 | 12.29 | 13.32 |

The examples in Table 19 were tested for tack-free cure times with examples 12-16 being run on bright sunny days with little or no cloud cover. Results for selected experiments are shown in Table 19. The delta E*ab values of example compositions 12 and 13 were similar despite the fact that example composition 12 lacks Sartomer CN9302 (oligomeric (meth)acrylate urethane oligomer with 5% to 12% free isocyanate reactive sites). Additionally, example composition 13 when used on pressure treated pine cured in a sun box also shows notable improvement over the control. Partial to full replacement of PU320 with Sartomer CN9302 (Example compositions 11-16) produced faster cure times than commercial embodiments of the prior U.S. Pat. No. 6,583,195, especially in experiments conducted in poor environmental conditions, such as those encountered in shaded areas and during overcast weather, both of which reduce the intensity of UV light radiation. Notably, when example compositions 12 through 16 were run on cloudy, overcast days, the surface tack-free cure times were only extended by 2 hours, which was a significant improvement over the prior patent composition. Example composition 11, lacking an unsaturated fatty acid triglyceride oil, exhibits the worst cure times out of all the tested examples. An additional unexpected improvement is observed when a 50/50 blend of PU320 and CN9302 (example composition 13) is used. Example composition 14 also exhibits good cure times. Pressure treated pine has the lowest cure times across all example compositions tested.

What is claimed is:

1. A substantially 100% solids sealant composition for application to a porous surface which comprises:
   an acrylate-methacrylate mixture, the acrylate-methacrylate mixture comprising at least an acrylate oligomer and at least a methacrylate oligomer, the acrylate oligomer having a lower molecular weight than the methacrylate oligomer;
   a functionalized resin having functionality of greater than 2 and a dynamic viscosity between 1,000 to 100,000 centipoise as measured by ASTM D2196;
   an unsaturated fatty acid triglyceride oil; and
   an organic or inorganic photoinitiator;
   wherein the functionalized resin is an oligomeric acrylate or oligomeric methacrylate functionalized with a compound selected from the group consisting of: urethane, polyester, epoxy, or siloxane.

2. The sealant composition of claim 1, wherein the acrylate oligomer is an aliphatic urethane acrylate oligomer and the methacrylate oligomer is an allyl dimethacrylate oligomer.

3. The sealant composition of claim 1, wherein the unsaturated fatty acid triglyceride oil is capable of entering into a free-radical initiated polymerization reaction.

4. The sealant composition of claim 1, further comprising a metal catalyst and an amine synergist, wherein the amount of metal catalyst ranges from 0.3% to 1.1% of the total weight of the sealant composition and the amount of the amine synergist ranges from 0.1% to 0.7% of the total weight of the sealant composition.

5. The sealant composition of claim 1, wherein the functionalized resin is an acrylate urethane oligomer or methacrylate urethane oligomer with 5% to 12% free isocyanate reactive sites.

6. The sealant composition of claim 1, wherein the amount of the acrylate-methacrylate mixture is 50% to 81% of the total weight of the sealant composition; the amount of the functionalized resin is 4% to 12% of the total weight of the sealant composition; the amount of the unsaturated fatty acid triglyceride oil is 10% to 25% of the total weight of the sealant composition; and the amount of the mixture of organic photoinitiators is 0.001% to 2% of the total weight of the sealant composition.

7. The sealant composition of claim 1, wherein the unsaturated fatty acid triglyceride oil is double boiled linseed oil or acrylated, epoxidized soybean oil.

8. The sealant composition of claim 2, wherein the acrylate-methacrylate mixture further comprises pentaerythritol acrylate monomer or pentaerythritol tetraacrylate monomer.

9. The sealant composition of claim 8, wherein the acrylate-methacrylate mixture further comprises trimethylolpropane triacrylate.

10. The sealant composition of claim 4, wherein the metal catalyst is an iron-containing catalyst or a tin-containing catalyst.

11. The sealant composition of claim 1, wherein the organic photoinitiator comprises:
    a phosphine oxide and a phenyl ketone.

12. The sealant composition of claim 11, further comprising a first propanone; and a mixture of a first benzophenone, a second benzophenone, and a second propanone;
    wherein the ratio of the first benzophenone to the second benzophenone to the second propanone ranges from 0.5 to 1.0 first benzophenone:0.03 to 1.0 second benzophenone:0.5 to 1.0 second propanone.

13. The sealant composition of claim 1 further comprising one or more of the following: an inert filler; a non-polymerizable fungicide; a non-polymerizable insecticide, a hindered amine light stabilizer; a UV absorber; a pigment; a dye; or a defoamer.

14. A method comprising mixing:
- an acrylate-methacrylate mixture, the acrylate-methacrylate mixture comprising at least an acrylate oligomer and at least a methacrylate oligomer, the acrylate oligomer having a lower molecular weight than the methacrylate oligomer;
- a functionalized resin having functionality greater than 2 and a dynamic viscosity between 1,000 to 100,000 centipoise as measured by ASTM D2196;
- an unsaturated fatty acid triglyceride oil; and
- an organic or inorganic photoinitiator;
  - wherein the functionalized resin is an oligomeric acrylate or oligomeric methacrylate functionalized with a compound selected from the group consisting of: urethane, polyester, epoxy, or siloxane.

15. The method of claim 14, wherein the mixing step further comprises mixing a metal catalyst and amine synergist.

16. The sealant composition of claim 1, wherein the photoinitiator is an inorganic photoinitiator.

17. The method of claim 14, wherein the photoinitiator is an inorganic photoinitiator.

18. The sealant composition of claim 1, wherein the functionalized resin is present in an amount of from 4% to 12% of the total weight of the sealant composition prior to being cured.

19. A sealant composition which comprises:
- an acrylate-methacrylate mixture, the acrylate-methacrylate mixture comprising at least an acrylate oligomer and at least a methacrylate oligomer, the acrylate oligomer having a lower molecular weight than the methacrylate oligomer;
- a functionalized resin having functionality of greater than 2 and a dynamic viscosity between 1,000 to 100,000 centipoise as measured by ASTM D2196;
- an unsaturated fatty acid triglyceride oil; and
- an organic or inorganic photoinitiator;
  - wherein the organic photoinitiator comprises:
  - a phosphine oxide and a phenyl ketone;
  - a first propanone; and
  - a mixture of a first benzophenone, a second benzophenone, and a second propanone.

* * * * *